United States Patent
Raksh et al.

(10) Patent No.: US 9,359,216 B2
(45) Date of Patent: Jun. 7, 2016

(54) METHOD FOR THE PREPARATION OF MWW TYPE ZEOLITE

(75) Inventors: Vir Jasra Raksh, Gujarat (IN); Das Jagannath, Gujarat (IN); Unnikrishnan Sreedharan, Gujarat (IN); Sakthivel Ayyamperumal, Chennai (IN)

(73) Assignee: Reliance Industries Limited, Mumbai, Maharashtra (IN)

( * ) Notice: Subject to any disclaimer, the term of this patent is extended or adjusted under 35 U.S.C. 154(b) by 465 days.

(21) Appl. No.: 13/988,937

(22) PCT Filed: Nov. 21, 2011

(86) PCT No.: PCT/IN2011/000806
§ 371 (c)(1),
(2), (4) Date: Aug. 19, 2013

(87) PCT Pub. No.: WO2012/070067
PCT Pub. Date: May 31, 2012

(65) Prior Publication Data
US 2013/0330273 A1 Dec. 12, 2013

(30) Foreign Application Priority Data
Nov. 23, 2010 (IN) .......................... 3205/MUM/2010

(51) Int. Cl.
*C01B 39/48* (2006.01)
*C01B 39/04* (2006.01)
*C01B 39/06* (2006.01)
*C01B 39/08* (2006.01)
*C01B 39/00* (2006.01)

(52) U.S. Cl.
CPC ................ *C01B 39/48* (2013.01); *C01B 39/00* (2013.01); *C01B 39/04* (2013.01); *C01B 39/065* (2013.01); *C01B 39/082* (2013.01)

(58) Field of Classification Search
CPC .... C01B 39/04; C01B 39/065; C01B 39/082; C01B 39/48
See application file for complete search history.

(56) References Cited

U.S. PATENT DOCUMENTS

| | | | | |
|---|---|---|---|---|
| 4,046,859 A | * | 9/1977 | Plank ........................ | B01J 23/30 423/703 |
| 4,310,440 A | * | 1/1982 | Wilson ................ | B01J 20/0292 208/112 |
| 4,560,542 A | * | 12/1985 | Robson ............... | C01B 33/2876 423/703 |
| 4,954,325 A | | 9/1990 | Rubin et al. | |
| 4,992,615 A | | 2/1991 | Huss, Jr. et al. | |
| 5,107,047 A | | 4/1992 | Del Rossi et al. | |
| 5,284,643 A | | 2/1994 | Morrison et al. | |
| 5,330,736 A | | 7/1994 | Wu et al. | |
| 5,382,742 A | | 1/1995 | Morrison et al. | |
| 5,558,851 A | | 9/1996 | Miller | |
| 6,500,996 B1 | | 12/2002 | Brown et al. | |
| 6,667,023 B2 | | 12/2003 | Ludvig | |
| 7,014,837 B2 | | 3/2006 | Corbin et al. | |
| 7,326,401 B2 | | 2/2008 | Tatsumi et al. | |
| 7,947,252 B2 | * | 5/2011 | Corma Canos .......... | B01J 23/22 423/704 |

FOREIGN PATENT DOCUMENTS

| | | |
|---|---|---|
| CN | 1296913 A | 5/2001 |
| CN | 1328960 A | 1/2002 |
| CN | 1500722 A | 6/2004 |
| CN | 1951811 A | 4/2007 |
| CN | 101012062 A | 8/2007 |
| EP | 1847510 A1 | 10/2007 |
| WO | 2007/058705 A1 | 5/2007 |
| WO | 2007/075383 A2 | 7/2007 |

OTHER PUBLICATIONS

International Search Report of PCT/IN2011/000806, mailed May 31, 2012, 3 pages.
W. Vermeiren and J.-P. Gilson, Impact of Zeolites on the Petroleum and Petrochemical Industry, Topics of Catalysis, 2009, pp. 1131-1161.
M. E. Leonowicz et al., MCM-22: A Molecular Sieve with Two Independent Multidimensional Channel Systems, Science, New Series, vol. 264, No. 5167, Jun. 24, 1994, pp. 1910-1913.
C. S Blackwell, Investigation of Zeolite Frameworks by Vibrational Properties, The Journal of Physical Chemistry, vol. 83, No. 25, 1979, pp. 3257-3261.
Mozgawa et al., Vibrational Spectra of Aluminosilicate Structural Clusters, Journal of Molecular Structure 704, 2004, pp. 247-257.
J.V. Smith, Topochemistry of Zeolites and Related Materials, Chemical Review, 88, 1988, pp. 149-182.
Morsli et al., Microporosity of the Amorphous Aluminosilicate Precursors of Zeolites: The Case of the Gels of Synthesis of Mordenite, Microporous and Mesoporous Materials 104, 2007, pp. 209-216.
Kan et al., Synthesis and Characterization of Strong Acidic Mesoporous Alumino-Silicates Constructed of Zeolite MCM-22 Precursors, Catalysis Communications 10, 2009, pp. 631-634.
J.S. J. Hargreaves, Powder X-ray diffraction and hetergeneous catalysis, Crystallography Reviews, vol. 11, Jan.-Mar. 2005, pp. 21-34.
Mochida et al., The effects of seeding in the synthesis of zeolite MCM-22 in the presence of hexamethyleneimine, Zeolites 18, 19978, pp. 142-151.

\* cited by examiner

*Primary Examiner* — David M Brunsman
(74) *Attorney, Agent, or Firm* — Collard & Roe, P.C.

(57) ABSTRACT

The present invention relates to a method for preparing MWW type zeolite; said method comprising i) intimately mixing together, in the absence of any organic structure directing agent or crystalline MWW type zeolite seeds, a predetermined quantity of a source of silicon dioxide, a source of metal oxide, water and a pH modifier to obtain an aqueous amorphous metallosilicate gel; and ii) hydrothermally treating said gel in the presence of an organic templating agent to provide a crystalline MWW type zeolite.

27 Claims, 2 Drawing Sheets

METHOD FOR THE PREPARATION OF MWW TYPE ZEOLITE

This application is the National Stage of PCT/IN2011/000806 filed on Nov. 21, 2011, which claims priority under 35 U.S.C. §119 of Indian Application No. 3205/MUM/2010 filed Nov. 23, 2010, the disclosures of which are incorporated by reference. The international application under PCT article 21(2) was published in English.

FIELD OF THE INVENTION

The present invention relates to a method for the preparation of MWW type of zeolite. Particularly, the present invention relates to a simple method for the preparation of MCM-22 zeolite in a short duration of synthesis period.

BACKGROUND OF THE INVENTION

Generally, "zeolite" is a broad term for crystalline porous aluminosilicates having $SiO_4$ and $AlO_4$ a tetrahedra as the basic units of the structure. The International Zeolite Association (IZA) has registered 179 different zeolites structures. Of these 179, only 18 are reported to be used in commercial operation. Zeolites have so far been extensively used in the petroleum industry and could still play an important role in refining, fine chemicals and petro chemistry and are described well by W. Vermeiren and J.-P. Gilson in the paper published in Topics in Catalysis 49 (2009) 1131. The industrial application value of zeolite is generally determined by the uniqueness of structure of the particular zeolite in question and the production cost of the said zeolite. Some zeolite structures, for example, MFI (referred as Mobil Five), FAU (referred as Faujasite), MOR (referred as Mordenite) are very versatile materials, i.e. their properties can be tuned to the specific requirements of different applications.

Among zeolite frameworks discovered in recent years, MWW structure is particularly useful in industry and is attracting a lot of attention. Zeolites with MWW structure are known to firstly crystallize as layered precursors intercalated with organic template molecules. The dehydroxylation and condensation between the two dimensional lamellar MWW precursors upon calcination in air lead to the formation of 3D MWW zeolite. Zeolites having MWW structure type, such as MCM-22 possess two independent pore systems. One system consists of two-dimensional sinusoidal 10-member ring (10-MR) channels with an elliptical ring cross section of 4.1 Å×5.1 Å. The other is composed of large 12-MR super-cage connected by 10-MR windows. These details are documented by M. E. Leonowicz et. al., in the paper published in Science 264 (1994) 1910.

Due to this unique structure of combination of both 10-MR and 12-MR channel systems, MCM-22 zeolite has been studied extensively as shape selective catalyst for many hydrocarbon conversions as well as an useful adsorbent for many separation and purification processes which are useful in the petroleum, petrochemical and refining industries. For example, U.S. Pat. No. 5,107,047 (1992) describes the application of MCM-22 zeolites for isomerization of olefins. Similarly, U.S. Pat. No. 4,992,615 (1991) describes alkylation of iso-paraffin with light olefins. In addition, application of MCM-22 for the production of cumene and ethyl benzene in liquid phase by alkylation of benzene with propylene or ethylene has been documented in the Encyclopedia of Chemical Processing, (ed. Lee S), Taylor & Francis, New York p. 603 and p 927. In a recent patent publication WO 2007058705 (2007), it is shown that MCM-22 is an efficient catalyst for the alkylation of benzene with long chain olefins. A process for purification through removal of olefins from the BTX stream has been described in U.S. Pat. No. 6,500,996 (2002).

MCM-22 type material was first reported by Rubin and Chu in U.S. Pat. No. 4,954,325 (1990), using hexamethylene-imine as a structure directing agent, under hydrothermal conditions in the range of 80-225° C. for 24 hours to 60 days. The said patent discloses that the source of silica must be comprised predominantly of solid silica, for example at least about 30 wt % of solid $SiO_2$ in order to obtain the crystalline MCM-22 product. The use of a silica source containing at least about 30 wt % solid silica, e.g., Ultrasil, (a precipitated, spray dried silica containing about 90% silica,), or HiSil (a precipitated hydrated $SiO_2$ containing about 87 wt % silica, 6 wt % free $H_2O$ and about 4.5 wt % bound $H_2O$ of hydration and having particle size of 0.02 micron) favour the formation of crystals of MCM-22. The patent further discloses that the use of sodium silicate (comprised of about 28.8 wt % $SiO_2$, 8.9 wt % of $Na_2O$ and 62.3 wt % $H_2O$) yields very little or none of the crystalline MCM-22 (claim 24, and Column 5, lines 32-50, U.S. Pat. No. 4,954,325). Therefore, it limits the range of silica sources which can be used for MCM-22 synthesis having high crystallinity.

Similar teaching are also available in the disclosures of U.S. Pat. No. 5,284,643 (1994) and in U.S. Pat. No. 5,382,742 (1995) wherein gallium containing zeolite MCM-22 has been described.

U.S. Pat. No. 7,326,401 (2008) describes a process for the production of MWW type zeolites having elements with large ionic radius (e.g., Ti, V, Sn etc) in the frame work. A four step method for their manufacturing has been reported, as (i) a step of heating a mixture containing template compound, a compound containing Group 13 element, of the periodic table, a silicon containing compound and water to obtain precursor (A); (ii) a step of acid treating the precursor (A) obtained in the first step; (iii) a step of heating the acid treated precursor (A) obtained in the second step together with a mixture containing a template compound and water to obtain a precursor (B); and (iv) a step of calcining the precursor (B) obtained in the third step to obtain a zeolite substance. Clearly, the procedure disclosed in U.S. Pat. No. 7,326,401 is complicated with too many steps for application purposes in a scaled up manner.

Usually zeolite synthesis is a long duration process and in many cases it takes about a week to obtain the zeolite with a well defined crystalline structure. In order to improve the crystallization of zeolites in general and to reduce the required crystallization period in particular, seeding of the synthesis mixture is a well known technique. Addition of seed enhance the rate of nucleation or crystallization of the zeolite material. Usually it is the same type of zeolite crystal added to the synthesis gel for enhancing the rate of nucleation or crystallization.

U.S. Pat. No. 4,954,325 (1990) and 5284643 (1994) indicate that the crystallization of MCM-22 zeolite is facilitated by the presence of 0.01-1.0 percent (based on total weight) of crystalline product.

U.S. Pat. No. 4,560,542 (1985) discloses a method for the preparation of zeolites (zeolite Beta and zeolite ZSM-8), using a low water and low alkali metal containing gel. An organic templating agent was added to a preformed metallo-silicate gel containing less than a specified amount of water and low alkali metal content and maintaining the mixture at crystallization conditions until the crystallization is complete. The method for the preparation of the zeolite, as specified in U.S. Pat. No. 4,560,542 comprises (i) forming a metallosilicate gel having less than 10 moles $H_2O$ per gram atom of silicon and an alkali metal content of less than about 0.4 atom per atom of silicon, said metallosilicate gel having been prepared by reacting a source of silica, a source of alumina and water to form a metallosilicate hydrogel, washing the said hydrogel to remove at least a portion residual soluble salts, and drying the washed hydrogel to form a gel having less than 10 moles $H_2O$ per gram atom of silicon and (ii) subsequently, mixing the said organic templating agent with the said reaction mixture having a mole ratio of $H_2O/SiO_2$ ranging from 2-10.

U.S. Pat. No. 5,330,736 (1994) discloses preparation of zeolite L from an aqueous mixture that contains from 0.1 to about 10% by weight of an amorphous metallosilicate gel which does not contain zeolite L. Using this mixture zeolite L can be made in a much shorter time than that with a synthesis mixture without the seeding gel and without any substantial impurity of other zeolites.

U.S. Pat. No. 6,667,023 (2003) discloses a process for synthesizing MFI type zeolite in the absence of an organic template but in the presence of an amorphous metallosilicate nucleating gel with a $SiO_2/Al_2O_3$ ratio from about 12 to about 17, as seed material. The $SiO_2/Al_2O_3$ ratio of the said amorphous metallosilicate nucleating gel, employed as seed, is very critical in realizing a well crystalline material and a deviation on either at lower end or at higher end from the specified $SiO_2/Al_2O_3$ ratio of the amorphous seed material results in drastic reduction of the crystallinity of the resultant MFI zeolite, e.g. to less than 70% or less than 50% or even less than 20%. In general, more the said deviation from SAR, more is the decrease in crystallinity of the resultant zeolite. In addition, the preparation of the said seed itself requires aging of several weeks together.

U.S. Pat. No. 5,558,851 discloses a method for crystallization of zeolite within the shaped particles while eliminating an external liquid crystallization phase which must be treated or disposed of after the crystallization is complete. In the specification section it is described that the addition of seed crystals is not a requirement of this process, however the process involves the use of a templating agent.

CN1951811A discloses octagonal zeolite synthesizing method which involves synthesizing under alkaline conditions, hydrothermal crystallization and adopting a low-molecular polyalcohol compound as molding agent without zeolite seed.

WO2007075383A2 discloses a process for preparing zeolite involving formation of a reactant gel that forms a precursor crystalline phase; crystallizing the gel; adding recrystallization agent; and completing crystallization. In WO2007075383, X-ray crystalline precursor phase is converted to other crystalline phase using a templating agent.

Corbin et al., in the U.S. Pat. No. 7,014,837 (2006) discloses the preparation of Zeolite A using pre-formed amorphous precursor with small addition of Zeolite A as seed in presence of tetramethyl ammonium hydroxide.

The effects of seeding in the synthesis of zeolite MCM-22 in the presence of hexamethyleneimine was reported by Isao Mochida et. al in the paper published in zeolites Zeolites 18 (1997) 142. The seeds were prepared from an aluminosilicate gel containing hexamethyleneimine and had a very low crystallinity. Addition of the hexamethyleneimine containing MCM-22 seed resulted in a reduction of the crystallization period of MCM-22 from a synthesis mixture that already contained the templating agent (hexamethyleneimine).

Thus, it is clear from the discussion on the prior art, that there are certain limitations in the art of preparation of MCM-22 zeolite in an easy and convenient manner in a short period, without any additional steps or need for modification of the existing commercial manufacturing facilities for production of zeolite.

Thus the present invention seeks to overcome the difficulties, disadvantages and deficiencies faced by the prior art by providing a method for preparing the MWW type of zeolite in an easy, convenient and rapid manner.

OBJECTS OF THE INVENTION

It is an object of the present invention to provide a simple and easy method for the preparation of MCM-22 zeolite with high crystallinity, yield and purity.

It is another object of the present invention to provide a method for the preparation of MWW type zeolite using inexpensive and abundant starting materials by rapid crystallization method.

It is still another object of the present invention to provide a method for the preparation of MWW type zeolite in the absence of both a crystallizing seed and a shape directing agent in the initial step of preparation without affecting the overall speed of the process.

It is yet another object of the present invention to prepare the MWW type zeolite using a rapid method, without requirement of any modification of the commercial zeolite manufacturing facilities.

SUMMARY OF THE INVENTION

In accordance with the present invention there is provided a method for preparing MWW type zeolite; said method comprising the following steps:

(i) intimately mixing together, in the absence of any organic structure directing agent or crystalline MWW type zeolite seeds, a predetermined quantity of a source of silicon dioxide, a source of metal oxide, water and a pH modifier to obtain an aqueous amorphous metallosilicate gel;

wherein said gel comprises at least one silicate selected from the group consisting of a metallosilicate species and double six membered silicate;

wherein the molar ratio of metal oxide to $SiO_2$ is in the range of about 0.01:1 to about 0.05:1 and the molar ratio of water to $SiO_2$ is in the range of about 10:1 to about 60:1; and (ii) hydrothermally treating said gel in the presence of an organic templating agent to provide a crystalline MWW type zeolite.

In accordance with one of the embodiments the hydro thermal treatment of said gel is performed in the presence of an aqueous alkali.

Typically, the source of silicon dioxide is at least one selected from the group consisting of hydrated precipitated silica, colloidal silica, ammonia-stabilized colloidal silica, sodium silicate, potassium silicate, calcium silicate, siloxane and alkoxy silane.

In accordance with the first embodiment of the present invention the source of silicon dioxide is colloidal silica.

In accordance with the second embodiment of the present invention the source of silicon dioxide is sodium silicate.

In accordance with the third embodiment of the present invention the source of silicon dioxide is ammonia-stabilized colloidal silica having between 30 to 40% weight of silica.

Typically, the source of metal oxide is at least one element of group IIIA of the periodic table.

Typically, the source of metal oxide is at least one selected from the group consisting of trivalent metal oxides and a mixture of the trivalent metal oxides.

Typically, the source of metal oxide is at least one selected from the group consisting of aluminium oxide, gallium oxide, aluminium alkoxides, sodium aluminate, aluminium sulphate, aluminium nitrate, gallium nitrate and mixtures thereof.

In accordance with one of the embodiments of the present invention the source of metal oxide is aluminium oxide.

In accordance with another embodiment of the present invention the source of metal oxide is gallium oxide.

In accordance with still another embodiment of the present invention the source of metal oxide is a mixture of aluminium oxide and gallium oxide.

Typically, the pH modifier is at least one selected from the group consisting of alkali and acids.

In accordance with one of the embodiments of the present invention the pH modifier is alkali and the molar ratio of alkali to $SiO_2$ is in the range of about 0.1:1 to about 0.5:1.

In accordance with another embodiment of the present invention the pH modifier is acid and the mole ratio of acid to $SiO_2$ is in the range of about 0.0:1 to about 0.25:1.

Typically, the pH modifier is at least one alkali selected from the group consisting of sodium hydroxide, lithium hydroxide, potassium hydroxide and cesium hydroxide.

Typically, the pH modifier is at least one acid is selected from the group consisting of inorganic acids, organic monobasic acids and organic polybasic acids.

Typically, the pH modifier is at least one acid selected from the group consisting of sulphuric acid, nitric acid, hydrochloric acid, phosphoric acid, formic acid, acetic acid, propionic acid, oxalic acid and succinic acid.

Typically, the pH modifier is sulphuric acid.

Typically, said gel has vibration bands at around 555-557 and 601-603 $cms^{-1}$ in the FT-IR spectroscopy of the amorphous gel.

Typically, the hydrothermal treatment is performed at a temperature in the range of about 40° C. to about 300° C., preferably from 60° C. and 250° C. and more preferably between 80° C. and 200° C.

Typically, the hydrothermal treatment is performed for a period of about 0.1 hour to about 200 hours, preferably from 1 hour to 150 hours and more preferably from 2 hours to 100 hours.

Typically, the hydrothermal treatment is performed at a pressure ranging from sub-atmospheric to supercritical, preferably from atmospheric to 100 bar.

Typically, the hydrothermal treatment is performed at a pressure equal to the pressure exerted by the vapours held within the vessel in which the hydrothermal treatment is carried out.

Typically, the hydrothermal treatment is performed at autogenous pressure which is preferably in the range of about 1 bar to about 50 bar.

Typically, the preparation of said gel is performed under continuous stirring during and after the addition of the components.

Typically, the templating agent is selected from the group consisting of hexamethyleneimine, N,N,N-trimethyl-1-adamantammonium hydroxide (TMAda+OH—), N,N,N,N',N', N'-hexamethylpentanediammonium ($Me_6$-diquat-5), piperidine, adamentyl trimethyl ammonium cation, adamentyl trimethyl ammonium cation in presence of isobutyl amine, N(16)-methyl-sparteinium hydroxide, triethylamine and methyltriethylammonium bromide.

Preferably, the templating agent is hexamethyleneimine.

In accordance with another embodiment of the present invention a method for preparing MWW type zeolite further includes a step of adding an alkali together with the templating agent to raise the pH of the gel in between 8 and 12.

BRIEF DESCRIPTION OF THE ACCOMPANYING DRAWINGS

DESCRIPTION OF THE INVENTION

Figure 1:
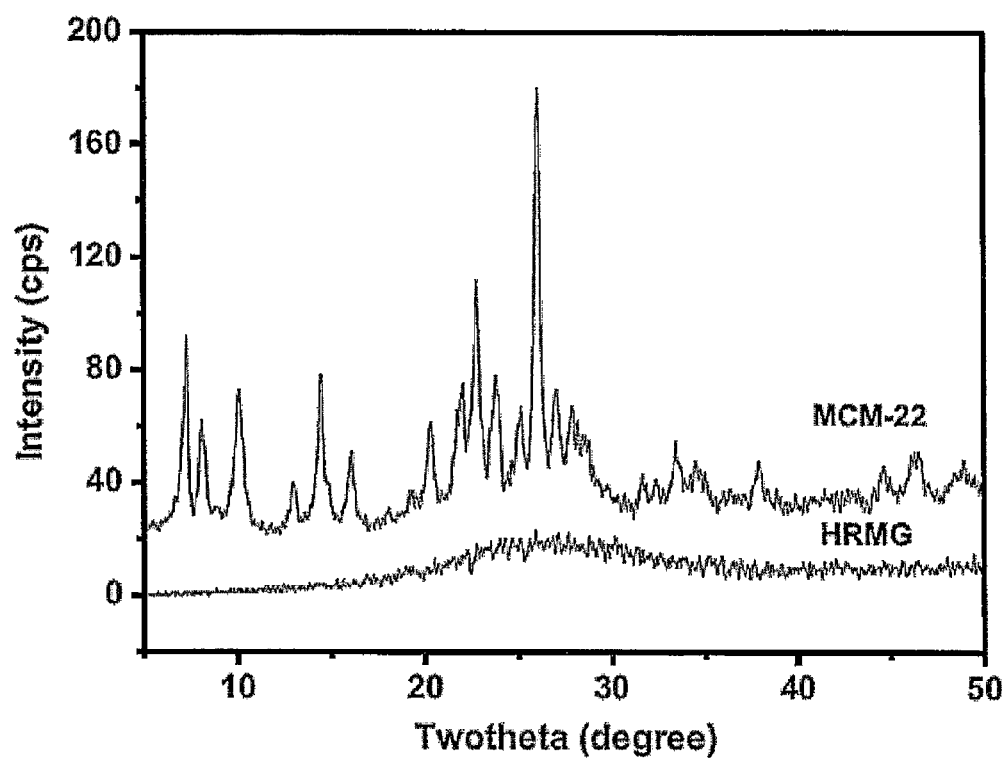
FIG. 1 illustrates XRD pattern of the metallosilicate gel (HRMG) and MCM-22.
Figure 2:
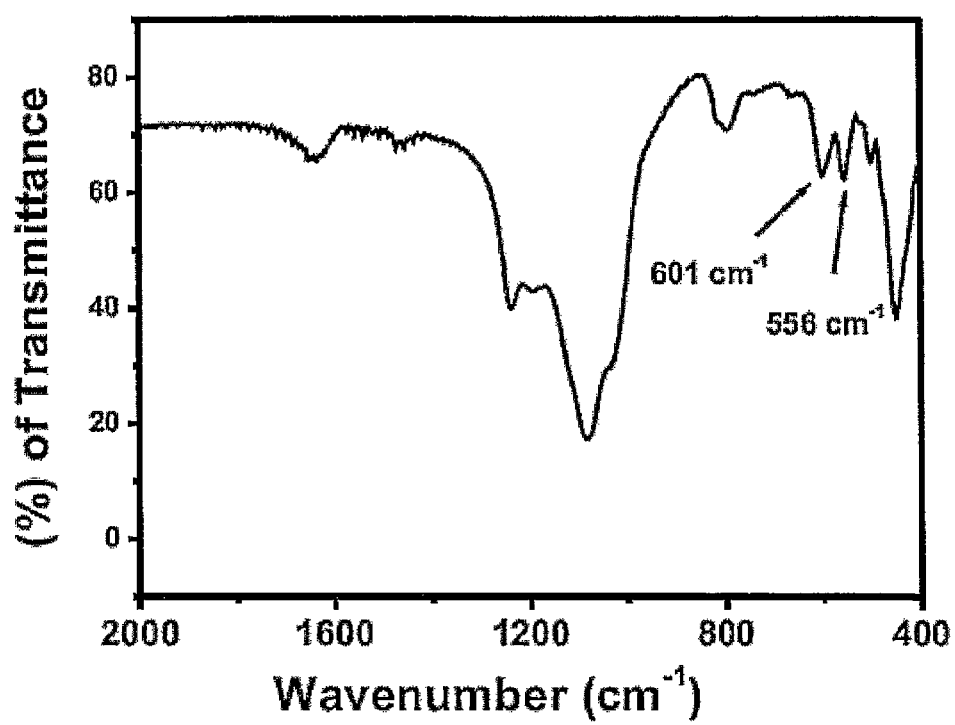
FIG. 2 illustrates FT-IR Spectra of the metallosilicate gel (HRMG) and MCM-22.

In accordance with the present invention, there is provided a method for the preparation of highly crystalline and pure phase of MWW type zeolite and more specifically MCM-22 type zeolite through hydrothermal treatment of a mixture of aqueous highly reactive X-ray amorphous metallosilicate gel and an organic structure directing agent, under conditions suitable for forming said zeolite, wherein the said X-ray amorphous metallosilicate gel inherently containing double six membered silicate or metallosilicate species is first prepared from a source of silicon dioxide, a source of metal oxide, water and a pH modifier.

Thus the current invention provides a method for preparation of zeolite having MWW type structure; said method comprising the following steps:

First step is intimately mixing a source of silicon dioxide, one or more source of metal oxide, water and a pH modifier to obtain a mixture.

Typically, the molar ratio of metal oxide to $SiO_2$ is in the range of about 0.01:1 to about 0.05:1 and the molar ratio of water to $SiO_2$ is in the range of about 10:1 to about 60:1.

Second step is treating the mixture under hydrothermal conditions sufficient enough to produce a highly reactive amorphous metallosilicate hydrogel comprising double six membered silicate or metallosilicate species.

Next step is, without going for any recovery of the amorphous gel, drying or grinding, addition of the organic templating agent either directly or as aqueous solution and optionally further addition of alkali solution to the aqueous amorphous metallosilicate mixture.

Typically, the templating agent is selected from the group consisting of hexamethyleneimine, N,N,N-trimethyl-1-adamantammonium hydroxide (TMAda+OH—), N,N,N,N',N', N'-hexamethylpentanediammonium ($Me_6$-diquat-5), piperidine, adamentyl trimethyl ammonium cation, adamentyl trimethyl ammonium cation in presence of isobutyl amine, N(16)-methyl-sparteinium hydroxide, triethylamine and methyltriethylammonium bromide.

Preferably, the templating agent is hexamethyleneimine.

Finally, said mixture is further treated under hydrothermal conditions to yield highly crystalline and pure zeolite of MWW type in a very short duration.

The highly reactive metallosilicate gel (HRMG) as described in the present invention, and prepared through hydrothermal treatment of metallosilicate gel in the absence of any organic templating agent or any kind of zeolite seed crystal, was found to be completely X-ray amorphous in nature, but was found to have vibration bands at around 555-557 and 601-603 $cm^{-1}$ in the FT-IR spectroscopy of the amorphous gel. Presence of such bands is believed to be due to presence of cyclic polymeric silicate or metalloslicate species in general particularly a double six membered polymeric species when the FT-IR vibration frequency lies in the range of about 540-570 and 590-630 $cm^{-1}$. Such assignment of the range of frequency of the FT-IR bands has been published in the papers by C. S Blackwell, in Journal of Physical Chemistry, 83 (1979) 3257, Mozgawa et al. in *Journal of Molecular Structure* 704 (2004) 247. The entire contents of these documents are incorporated herein as references.

The improvement or technical advancement in the method of preparation of the present invention is primarily based on the preparation of the aqueous mixture of highly reactive metalosilicate gel, which possesses double six membered silicate or metallosilicate species. It was found unexpectedly that the treatment of such amorphous, highly reactive metallosilicate gel in the presence of suitable organic templating agent led to the formation of highly crystalline MWW structure quickly and without any impurity in the crystalline phase. On the other hand, continuation of hydrothermal treatment of the highly reactive alkaline aqueous metallosilicate hydrogel, (in the absence of organic templating agent, the hexamethyleneimine), in a manner similar to the that employed for the preparation of the desired crystalline phase neither yielded any phase as sought for nor any crystalline material, but also remained amorphous only as examined by XRD technique. At the same time the vibrational band around 550-560 and 601-610 $cm^{-1}$ noted with the amorphous highly reactive metallosilicate gel, disappeared after such treatment indicating the highly reactive metallosilicate gel got converted to species other than double six membered silicate or metallosilicate species.

It is also be noted that use of such amorphous metallosilicate gel, possessing double six membered ring species for the synthesis of zeolites having MWW structure was not known hereinbefore. It is further be noted that the preparation of aqueous amorphous mixture of the reactive metallosilicate gel do not involve any addition of either microcrystalline MWW zeolite seed or any other zeolite as seed or any organic templating agent.

It is to be noted that presence of double six membered ring silicate or metalloslicate species could be found in many of the families of zeolite structure types, for example, FAU, LTL, CHA, ERI, EMT, GME, LEV, EAB, KFI, LTN as described in detail in the paper by J. V. Smith in *Chemical Review*, 88 (1988) 149. In addition, merely the presence of double six membered ring silicate or metalosilicate species in the amorphous metallosilicate gel is definitely not a necessary and sufficient condition for forming the said zeolite, since the MWW type structure contains variety of metallosilicate ring species, e.g. four membered, five membered and six membered. Thus the double six membered metallosilicate species could not be considered either as nuclei of the MWW structure, nor as a micro-crystalline seed of MWW structure. This is because continuation of the hydrothermal treatment (without addition of organic templating agent) after the aqueous highly reactive metallosilicate hydrogel had been formed, even under conditions suitable for formation of MWW type zeolite, did not yield the required crystalline phase or even any other phase as well and remained amorphous only. Rather, the double six membered ring silicate or metallosilicate species, originally present in the highly reactive metallosilicate gel, disappeared and changed to some other non-crystalline material.

While not wishing to be limited by theory, it is believed that, the high reactivity of the metallosilicate towards formation of highly crystalline and pure phase of MWW type zeolite structure is mainly due to the presence of double six membered silicate or metallosilicate species. It is to be noted that because of such high reactivity of the aqueous metallosilicate gel, it is possible to obtain the highly crystalline and pure phase of MWW type zeolite structure, in a short span of hydrothermal treatment, resulting in an affordable and the most suitable method for the preparation of the said zeolite. In addition, presence of the double six membered ring species in the said aqueous metallosilicate gels facilitated the formation of the said MWW type structure.

For the purpose of practicing the invention, a variety of compounds containing silicon dioxide are employed for example, hydrated precipitated silica, aqueous solution of colloidal silica or organic sources of silicon viz, alkoxy silane or siloxanes, sodium silicate, potassium silicate and calcium silicate. In one of the preferred embodiments of the present invention ammonia stabilized colloidal silica having 30 or 40 wt % silica is used.

The oxides of group IIIA elements employed in the preparation of metallosilicate gel of the present invention are trivalent metal oxide or a mixture of the trivalent metal oxides.

In another embodiment of the present invention the source of metal oxide is at least one oxide selected from the group consisting of nitrate salts of said elements such as aluminium nitrate & gallium nitrate, sulphate salts of said elements such as aluminium sulphate, alkyl oxides of said elements and any other inorganic or organic compounds of the said Group IIIA elements such as sodium aluminate, aluminium alkoxides and mixture thereof.

Typically, the pH modifier used in the preparation of metallosilicate gel of the present invention is at least one selected from the group consisting of alkali and acids.

In accordance with one of the embodiment of the present invention the pH modifier is alkali and the molar ratio of alkali to $SiO_2$ is in the range of about 0.1:1 to about 0.5:1.

The choice of alkali comprises of any hydroxide of the Group IA metal, viz, lithium hydroxide, sodium hydroxide, potassium hydroxide and cesium hydroxide. Preferably, the alkali used for preparing metallosilicate gel is sodium hydroxide for the purpose of convenience and the cost benefit.

In accordance with one of the embodiments of the present invention sodium hydroxide is employed with colloidal silica (as a source of silicon dioxide) in the preparation of highly reactive metallosilicate gel of the present invention Typically, the oxide based molar composition of the synthesis mixture for the preparation of highly reactive metallosilicate gel, expressed as per mole of SiO2 is $SiO_2$:x $M_2O_3$:y NaOH:n $H_2O$, wherein x is in the range of 0.01 to 0.05, y is in the range of 0.1 to 0.5 and n is in the range of 10 to 60 and M is selected from one or more of the elements of Group III A of the periodic table or mixture thereof.

In accordance with another embodiment of the present invention the pH modifier is acid and the mole ratio of acid to $SiO_2$ is in the range of about 0.0:1 to about 0.25:1.

The acid is at least one selected from the group consisting of inorganic acids, organic monobasic acids and organic polybasic acids. Particularly, the choice of acid includes sulphuric acid, nitric acid, hydrochloric acid, phosphoric acid, formic acid, acetic acid, propionic acid, oxalic acid and succinic acid.

In accordance with one of the embodiments of the present invention sulphuric acid is employed with sodium silicate (as a source of silicon dioxide) in the preparation of highly reactive metallosilicate gel of the present invention. Typically, sodium silicate comprises 27.9 wt. % $SiO_2$ and 5.05 wt. % of $Na_2O$.

Typically, the oxide based molar composition of the synthesis mixture for the preparation of highly reactive metallosilicate gel, expressed as per mole of $SiO_2$ is $SiO_2$:x $M_2O_3$:y $Na_2O$:z $H_2SO_4$:n $H_2O$, wherein x is in the range of 0.01 to 0.05, y is in the range of 0.05 to 0.5, z is in the range of 0-0.15, and n is in the range of 10 to 60 and M is selected from one or more of the elements of Group III A of the periodic table or mixture thereof.

In one of the embodiments of the present invention the preparation of the gel is carried out either by mixing the aqueous solution of the source of silicon dioxide to the source of oxide of Group IIIA element or by a reverse manner. However, it is preferred that the mixture is stirred continuously during and after the addition of the components.

The aqueous alkaline mixture of the source of silicon dioxide and source of oxide of Group IIIA element is then treated hydrothermally at a temperature in the range from 40° C. to 300° C., preferably from 60° C. to 250° C. and more preferably in the range of 80° C. to 200° C.

The pressure during the hydrothermal treatment is from sub-atmospheric to super critical range preferably from atmospheric to 100 bar. However, it is found convenient to carry out the hydrothermal treatment at a pressure equal to the pressure exerted by the vapours or gases held within the vessel at the temperature at which the hydrothermal treatment is being carried out. This may be equal to the autogeneous pressure and is in the range from 1 bar to 50 bar. The duration of hydrothermal treatment is in the range of 0.1 hour to 200 hours, preferably from 1 hour to 150 hour and more preferably from 2 hour to 100 hours.

For examination of the nature of the reactive metallosilicate gel a portion can be recovered by any known means, e.g., decantation, filtration, centrifuging and then dried by any known means, e,g., air blowing, or air drying or warming or by drying in an oven at a temperature in the range of 40° C. to 90° C. Thus the nature of the metallosilicate gel, dried by any means as described, was established through analysis using X-ray diffraction for any crystalline phase or micro-crystallinity. The analysis by X-ray diffraction for zeolites and or any other crystalline material is well known to people skilled in the art, however for the purpose of reference the article on "Powder X-ray diffraction and Heterogeneous Catalysis" by J. S. J Hargreaves, Crystallography Reviews, 11 (2005) 21 is cited. The X-ray diffraction analysis of the reactive metallosilicate gel, showed a completely amorphous material, without any trace of micro-crystallinity. In addition, the nature of the metalloslicate gel was also examined by Fourier Transformed Infra Red (FT-IR) Spectroscopy, following the standard method (using potassium bromide pellet) as practiced for the analysis of zeolite. For the purpose of convenience, however, the entire contents of the published papers by Morsli et al., in Microporous and Mesoporous Materials 104 (2007) 209, and by Kan et al. in Catalysis Communications 10 (2009) 631, are incorporated herein as references.

According to the method of the present invention, after the hydrothermal treatment is over, the aqueous alkaline mixture of the metallosilicate gel is cooled down and the organic templating agent is added to the mixture either directly or as aqueous solution and stirred well to homogenize the mixture. Optionally, additional quantity of alkali is added to have a higher pH of the gel, particularly in the range of about 8 to 12.

The aqueous alkaline mixture of the amorphous reactive metallosilicate gel and the organic templating agent is then treated hydrothermally at a temperature in the range of 40° C. to 300° C., preferably from 50° C. to 250° C.

The pressure during the hydrothermal treatment is from sub-atmospheric to super critical range preferably from atmospheric to 100 bar. However, it has been found convenient to carry out the hydrothermal treatment at a pressure equal to the pressure exerted by the vapours or gases held within the vessel at the temperature at which the hydrothermal treatment is being carried out. This may be equal to the autogeneous pressure and is in the range of 1 bar to 50 bar.

The duration of hydrothermal treatment is in the range of 0.1 hour to 200 hours, preferably from 1 hour to 150 hour and more preferably from 2 hour to 100 hours.

The highly crystalline pure zeolite of MWW type is recovered from the treated reaction mixture by any known means and dried. The pure MWW type zeolite powder is in its sodium form and is converted to any desired cationic form including protonic form, by any established and known means.

For the purpose of application as catalysts and or adsorbents, the pure zeolite of MWW type, prepared according to the present invention could also be formed in to shapes like extrudate, spheres, trilobes or tetralobes etc by mixing with any binder known in the art.

The MWW type of zeolite prepared according to the present invention could be used for various hydrocarbon transformations, such as isomerization, alkylation, disproportionation, cracking, hydro-cracking etc, by contacting the said zeolite material in any chemical or physical form, with the hydrocarbons under conditions sufficient to affect the transformations. Similarly, the MWW type of zeolite prepared according to the present invention could be employed for separation of various hydrocarbons or purification of hydrocarbons streams by said zeolite material in any chemical or physical form, with the hydrocarbon mixture of the hydrocarbon streams under conditions sufficient to affect the separations or the purification.

The invention will now be described in greater detail with reference to the following examples, which are presented here for the purpose of illustration only and should not be construed as limitative of the scope of the present invention.

Example 1-4

Preparation of Highly Reactive Metallosilicate Gel (HRMG)

A solution comprising 1.87 gram of sodium hydroxide in 80 ml water was added to 66.7 gram of colloidal silica (Ludox As-40) to form a mixture A. Solution B was prepared by mixing 2.822 gm of sodium aluminate in 80 ml water. Then solution B was mixed with the mixture A and stirred for 1 hr. or till a homogeneous gel was achieved. The gel was transferred to a teflon lined autoclave and was treated hydrothermally at 180° C. for 4 hours with continuous stirring. After the treatment, the mixture was cooled to room temperature and was termed as HRMG-n (where n=1, 2, 3, etc as per the example number). A small aliquot of the gel was collected for XRD and FT-IR analysis. The aliquot was dried in air oven at 90° C. for overnight before the analysis.

Following the same procedure, but with required amount of ingredients as per the composition mentioned below, a number of highly reactive metallosilicate gel samples were prepared from different composition with respect to silica to metal oxide ratio in the gel.

TABLE 1

Molar composition of different HRMG and synthesis conditions

| | Example No | | | |
|---|---|---|---|---|
| | 1 | 2 | 3 | 4 |
| | Sample No | | | |
| | HRMG-1 | HRMG-2 | HRMG-3 | HRMG-4 |
| Molar Oxide omposition | | | | |
| $SiO_2$ | 1 | 1 | 1 | 1 |
| $Al_2O_3$ | 0.033 | 0.025 | 0.0167 | 0.01 |

TABLE 1-continued

Molar composition of different HRMG and synthesis conditions

| | Example No | | | |
|---|---|---|---|---|
| | 1 | 2 | 3 | 4 |
| | Sample No | | | |
| | HRMG-1 | HRMG-2 | HRMG-3 | HRMG-4 |
| NaOH | 0.24 | 0.24 | 0.24 | 0.24 |
| H$_2$O | 25 | 25 | 25 | 25 |
| Reaction Conditions | | | | |
| Temperature, °C. | 180 | 180 | 180 | 180 |
| Duration, hrs. | 4 | 4 | 4 | 4 |

In each case of the samples HRMG-1 to HRMG-4, the XRD analysis of the aliquot sample showed completely amorphous nature of the solid material, while the FT-IR ananysis (in KBr pellet), showed band (doublet) in the range of about 555-557 cm$^{-1}$ and 600-603 cm$^{-1}$, indicating presence of double six membered silicate or metallosilicate species in the solid material.

Example 5-6

Preparation of Highly Reactive Metallosilicate Gel (HRMG)

Following the same procedure as described in examples 1-4, more number of samples of highly reactive metallosilicate gel were prepared form different composition having various alkali and water concentration.

TABLE 2

Molar composition of different HRMG and synthesis conditions

| | Example No | |
|---|---|---|
| | 5 | 6 |
| | Sample No | |
| | HRMG-5 | HRMG-6 |
| Molar Oxide Composition | | |
| SiO$_2$ | 1 | 1 |
| Al$_2$O$_3$ | 0.033 | 0.0385 |
| NaOH | 0.21 | 0.147 |
| H$_2$O | 25 | 19.45 |
| Reaction Conditions | | |
| Temperature, °C. | 180 | 180 |
| Duration, hrs. | 4 | 4 |

Once again, in each case of the samples HRMG-5 and HRMG-6, the XRD analysis of the aliquot sample showed completely amorphous nature of the solid material, while the FT-IR analysis (in KBr pellet), showed band (doublet) in the range of about 555-557 cm$^{-1}$ and 600-603 cm$^{-1}$, indicating presence of double six membered silicate or metalosilicate species in the solid material.

Example 7-11

Preparation of MCM-22 Using Highly Reactive Metallosilicate Gel

Template solution was prepared by dissolving 26.45 gm of hexamethyleneimine (HMI) and 1.07 gm sodium hydroxide in 160 gm of water. The template solution was slowly added to about 230 gm of highly reactive metallosilicate gel (HRMG-1, as prepared in Example 1), with continuous stirring. The gel was stirred continuously for another 1 hr. to get homogeneous mixture. The resultant gel was transferred to a Berghof autoclave and treated for 120 h at temperature of 160° C. with continuous stirring.

After the crystallization period, the sample was washed well with warm distilled water to remove excess sodium hydroxide, filtered and dried in an air oven overnight. The dried samples were calcined at 550° C. for 6 h in air with flow of 50-100 ml/min.

XRD analysis of the solid material showed a highly crystalline MCM-22 phase without any additional crystalline phase impurity. FT-IR spectra also showed the characteristics bands for the presence of double six membered ring species in the range of 555-557 cm$^{-1}$ and 600-603 cm$^{-1}$.

Following the same procedure, different batches of MCM-22 were prepared by using the highly reactive metallosilicate gel as described in example 1-4. The details of overall composition of the synthesis gels and reaction conditions are included in table 3.

TABLE 3

Molar composition and synthesis conditions of MCM-22 using various HRMG

| | Example No | | | | |
|---|---|---|---|---|---|
| | 7 | 8 | 9 | 10 | 11 |
| | HRMG used | | | | |
| | HRMG-1 | HRMG-2 | HRMG-3 | HRMG-4 | HRMG-1 |
| Molar Oxide Composition | | | | | |
| SiO2 | 1 | 1 | 1 | 1 | 1 |
| Al2O3 | 0.033 | 0.025 | 0.0167 | 0.01 | 0.033 |
| NaOH | 0.3 | 0.3 | 0.3 | 0.3 | 0.3 |
| HMI | 0.6 | 0.6 | 0.6 | 0.6 | 0.6 |
| H2O | 45 | 45 | 45 | 45 | 45 |
| Reaction Conditions | | | | | |
| Temperature, °C. | 160 | 160 | 160 | 160 | 170 |
| Duration, hrs. | 120 | 120 | 120 | 120 | 40 |

In each of the case of example 7 to 11, XRD analysis of the solid material showed a highly crystalline MCM-22 phase without any impurity. FT-IR spectra also showed the characteristics bands for the presence of double six membered ring species in the range of 555-557 cm$^{-1}$ and 601-603 cm$^{-1}$. It could be seen that, the pure phase of MCM-22 could be obtained even at a very short period of crystallization.

Example 12

To 230 gm of highly reactive metallosilicate hydrogel (HRMG-5), as prepared in the Example 5, a solution containing 19.84 gm of hexamethyleneimine in 40 gm of water was added with continuous stirring. The gel was stirred continuously for another 1 hr. to get homogeneous mixture. The overall composition of the gel was SiO$_2$:0.033Al$_2$O$_3$:0.21 NaOH:0.45HMI:30H$_2$O.

The gel was stirred for another hour to get homogeneous mixture. The resultant gel was treated hydrothermally at 170° C. for 48 hours with continuous stirring. After the treatment, the solid was recovered and calcined following the procedure described earlier. The XRD analysis of the solid material showed a highly crystalline MCM-22 phase without any impurity. FT-IR spectra also showed the characteristics bands for the presence of double six membered ring species in the range of 555-557 cm$^{-1}$ and 601-603 cm$^{-1}$.

Example 13

To 205 gm of highly reactive metallosilicate hydrogel (HRMG-6) as prepared in the Example 6, was added 17.5 gm of hexamethyleneimine with continuous stirring. The gel was stirred continuously for another 2 hrs. to get homogeneous mixture. The overall composition of the gel was $SiO_2$:0.039 $Al_2O_3$:0.15 NaOH:0.35 HMI:19.45$H_2O$. The resultant gel was treated hydrothermally at 170° C. for 40 h with continuous stirring. After the treatment, the solid was recovered and calcined following the procedure described earlier. The XRD analysis of the solid material showed a highly crystalline MCM-22 phase. No other co-crystallized phase was observed in the XRD pattern of the material. FT-IR spectra also showed the characteristics bands for the presence of double six membered ring species in the range of 555-557 cm$^{-1}$ and 600-603 cm$^{-1}$.

Example 14

This example shows the influence of continued hydrothermal treatment of the highly reactive metallosilicate gel, without addition of any organic template, alkali or water.

A sample of highly reactive metallosilicate gel was prepared through hydrothermal treatment at 180° C. for 4 hours, following the procedure described in Example 1. The analysis of the aliquot solid sample revealed it X-Ray amorphous, but showing the characteristic FT-IR vibration bands indicating the presence of double six membered silicate or metallosilicate species. Without addition of any templating agent (hexamethyleneimine), or alkali or water, the gel as such was subjected to hydrothermal treatment in stirring conditions at 170° C. for 48 hours.

After the crystallization period, the solid material was recovered, dried and calcined as per the procedure described earlier. The final product was found to be X-ray amorphous. Surprisingly, the FT-IR spectra also did not show any vibrational band corresponding to the double six membered ring silicate or metallosilicate species.

Example 15

This example shows the influence of addition of alkali solution only, but not the hexamethyleneimine (organic templating agent) to the highly reactive metallosilicate gel before continuing the hydrothermal treatment.

A sample of highly reactive metallosilicate gel (HRAG) was prepared by following the procedure as given in Example 1. An aliquot of the gel was examined by XRD and FT-IT spectroscopy. The sample was found to be completely amorphous but FT-IR showed small bands at about 555-557 cm$^{-1}$ and 600-603 cm$^{-1}$ indicating the presence of double six membered silicate or metallosilicate species in the gel. An alkali solution containing 1.07 gm of sodium hydroxide in 80 ml water was added to the aqueous mixture of highly reactive aluminosilicate gel and stirred for homogenization. No hexamethyleneimine was added to this gel. The mixture was treated hydrothermally for crystallization at 170° C. under stirring conditions (300 rpm) for 48 hours. After the crystallization period, the sample was washed well with warm distilled water to remove excess sodium hydroxide, filtered and dried in an air oven overnight. The dried samples were calcined at 550° C. for 6 h in air with flow of 50-100 ml/min. The final product did not show any sort of crystallinity and remained amorphous in nature.

Example 16

This example shows the effect of organic templating agent (hexamethyleneimine) addition in the beginning of preparation of highly reactive metalloslicate gel.

Mixture A was first prepared by combining 150 gm of colloidal silica and a sodium hydroxide solution (1.8 gm of sodium hydroxide in 160 of water). Solution B was prepared by mixing 7.4 gm of sodium aluminate in 100 ml water, and was added to mixture A with continuous stirring. The stirring was continued for 1 hour to get a homogeneous mixture. Then 35 gm of HMI was added in to the gel and the mixture was again homogenized. The overall composition of the metallosilicate gel mixture was $SiO_2$:0.033$Al_2O_3$:0.15 NaOH: 0.35HMI:19.45$H_2O$.

The mixture was treated in a teflon lined autoclave at 180° C. for 4 hours. The gel was amorphous in nature as revealed by XRD analysis and surprisingly FT-IR spectra of the sample also did not show any characteristic band at the region of 555-557 cm$^{-1}$ and 600-603 cm$^{-1}$. Hydrothermal treatment of the gel was continued for further at 170° C. for 48 h. After the treatment, the mixture was worked up as described earlier to recover the solid mass. XRD analysis of the solid mass did not show any MCM-22 phase or any other crystalline phase, it remained amorphous only. The FT-IR spectra also did not show the characteristics bands for the presence of double six membered ring silicate or metallosilicate species.

Example 17

Preparation of Ga-MCM-22 Using Highly Reactive Gallosilicate Gel

This example describes the preparation of highly reactive gallosilicate gel and its use for the preparation of gallium substituted MCM-22 (Ga-MCM-22), using the highly reactive gallosilicate gel.

A solution of 4.27 gm of sodium hydroxide in 80 g of water was added to 66.66 gm of colloidal silica (Ludox AS-40) with continuous stirring to form mixture A. Solution B was prepared by mixing 7.50 gm of gallium nitrate in 80 ml water. Then solution B was mixed with solution A and stirred for 1 h and the final gallosilicate gel mixture was heated at 180° C. for 4 hours in Teflon lined autoclave with continuous stirring. The resultant gel was cooled to room temperature and termed as HRMG-7. A small aliquot of the gel was collected for XRD and FT-IR analysis. The XRD analysis of the aliquot sample showed completely amorphous nature of the solid material, while the FT-IR analysis (in KBr pellet), showed band (doublet) in the range at 555-557 cm$^{-1}$ and 600-603 cm$^{-1}$, indicating presence of double six membered silicate or metallosilicate species in the solid material.

A template solution was prepared by dissolving 26.45 gm of hexamethyleneimine (HMI) and 1.07 gm of sodium hydroxide in 160 gm of water. The template solution was slowly added into about 230 gm of HRMG-7 with continuous stirring. The gel was stirred continuously for another 1 h to get homogeneous mixture. The resultant gel was kept in autoclave and allowed for crystallization at 160° C. for 120 h in stirring conditions (300 rpm). After the crystallization period, the solid material was recovered and calcined following the procedure as described earlier.

The XRD analysis of the solid material showed a highly crystalline MCM-22 phase without any additional impurity. FT-IR spectra also showed the characteristics bands for the presence of double six membered ring species in the range of 555-557 $cm^{-1}$ and 600-603 $cm^{-1}$ Example 18-22

Preparation of Highly Reactive Metallosilicate Gel (HRMG) Using Sodium Silicate

A solution was prepared comprising of 120 gram of commercial sodium silicate (27.9 wt. % $SiO_2$ & 5.05 wt. % of $Na_2O$) in 150 ml water to form mixture A. Solution B was prepared by mixing 11.6 gm of aluminium sulphate in 100 ml water containing 8.0 gm of concentrated sulphuric acid. Then solution B was mixed with the mixture A and stirred vigorously for 1 h or till a homogeneous gel was achieved. The gel was transferred to a teflon lined autoclave and was treated hydrothermally at 180° C. for 4 hours with continuous stirring. After the treatment, the mixture was cooled to room temperature and was termed as HRMG-n (where n=1, 2, 3, etc as per the example number). A small aliquot of the gel was collected for XRD and FT-IR analysis. The aliquot was dried in air oven at 90° C. for overnight.

Following the same procedure, but with required amount of ingredients as per the composition mentioned below, a number of highly reactive metallosilicate gel samples were prepared from different composition with respect to silica to metal oxide ratio in the gel.

TABLE 4

Molar composition of different HRMG and synthesis conditions

| | Example No | | | | |
|---|---|---|---|---|---|
| | 1 | 2 | 3 | 4 | 5 |
| | Sample No | | | | |
| | HRMG-1 | HRMG-2 | HRMG-3 | HRMG-4 | HRMG-5 |
| Molar Oxide composition | | | | | |
| $SiO_2$ | 1 | 1 | 1 | 1 | 1 |
| $Al_2O_3$ | 0.033 | 0.025 | 0.0167 | 0.01 | 0.033 |
| $Na_2O$ | 0.2 | 0.2 | 0.2 | 0.2 | 0.2 |
| $H_2SO_4$ | 0.15 | 0.15 | 0.15 | 0.15 | 0.075 |
| $H_2O$ | 35 | 35 | 35 | 35 | 35 |
| Reaction Conditions | | | | | |
| Temperature, ° C. | 180 | 180 | 180 | 180 | 180 |
| Duration, h | 4 | 4 | 4 | 4 | 4 |

In each case of the samples HRMG-1 to HRMG-5, the XRD analysis of the aliquot sample showed completely amorphous nature of the solid material, while the FT-IR analysis (in KBr pellet), showed broad band around 550-560 $cm^{-1}$ and 601-610 $cm^{-1}$ indicating presence of double six membered silicate or metallosilicate species in the solid material.

Example 23

Preparation of Highly Reactive Metallosilicate Gel (HRMG) Using Colloidal Silica A solution comprising of 1.87 gram of sodium hydroxide in 80 ml water was added to 66.7 gram of colloidal silica (Ludox AS-40) to form mixture A. Solution B was prepared by mixing 2.822 gm of sodium aluminate in 80 ml water. Then solution B was mixed with the mixture A and stirred for 1 h or till a homogeneous gel was achieved. The gel was transferred to a teflon lined autoclave and was treated hydrothermally at 180° C. for 4 hours with continuous stirring. After the treatment, the mixture was cooled to room temperature and was termed as HRMG-6. A small aliquot of the gel was collected for XRD and FT-IR analysis. The aliquot was dried in air oven at 90° C. for overnight.

Example 24-30

Preparation of MCM-22 Using Highly Reactive Metallosilicate Gel (HRMG-1)

19.52 g of hexamethyleneimine (HMI) was added to about 390 g of highly reactive metallosilicate gel (HRMG-1, as prepared in Example 18), with continuous stirring. The gel was stirred continuously for another 1 h to get homogeneous mixture. The resultant gel was transferred to a Teflon lined autoclave and treated for 72 h at temperature of 170° C. with continuous stirring.

After the crystallization period, the sample was washed well with warm distilled water to remove excess sodium hydroxide, filtered and dried in an air oven overnight. The dried samples were calcined at 550° C. for 6 h in air with flow of 50-100 ml/min.

XRD analysis of the solid material showed a highly crystalline MCM-22 phase without any co-crystallized product. FT-IR spectra also showed the characteristics bands for the presence of double six membered ring species in the range of around 550-560 $cm^{-1}$ and 601-610 $cm^{-1}$.

Following the same procedure, different batches of MCM-22 were prepared by using the highly reactive metallosilicate gel as described in example 18-22. The details of overall composition of the synthesis gels and reaction conditions are included in table 5.

Using the HRMG-1, with the same procedure described as above another series of MCM-22 were prepared by using different crystallization period and the details are shown in table 5.

TABLE 5

Molar composition and synthesis conditions of MCM-22 using various HRMG

| | Example No | | | | | | |
|---|---|---|---|---|---|---|---|
| | 24 | 25 | 26 | 27 | 28 | 29 | 30 |
| HRMG used | HRMG-1 | HRMG-2 | HRMG-3 | HRMG-4 | HRMG-5 | HRMG-1 | HRMG-1 |
| Molar Oxide Composition | | | | | | | |
| $SiO_2$ | 1 | 1 | 1 | 1 | 1 | 1 | 1 |
| $Al_2O_3$ | 0.033 | 0.025 | 0.0167 | 0.01 | 0.033 | 0.033 | 0.033 |

TABLE 5-continued

Molar composition and synthesis conditions of MCM-22 using various HRMG

| | Example No | | | | | | |
|---|---|---|---|---|---|---|---|
| HRMG used | 24 HRMG-1 | 25 HRMG-2 | 26 HRMG-3 | 27 HRMG-4 | 28 HRMG-5 | 29 HRMG-1 | 30 HRMG-1 |
| $Na_2O$ | 0.2 | 0.2 | 0.2 | 0.2 | 0.2 | 0.2 | 0.2 |
| HMI | 0.35 | 0.35 | 0.35 | 0.35 | 0.35 | 0.35 | 0.35 |
| $H_2SO_4$ | 0.15 | 0.15 | 0.15 | 0.15 | 0.075 | 0.15 | 0.075 |
| $H_2O$ | 35 | 35 | 35 | 35 | 35 | 35 | 35 |
| Reaction Conditions | | | | | | | |
| Temperature, ° C. | 160 | 160 | 160 | 160 | 170 | 160 | 170 |
| Duration, h | 72 | 72 | 72 | 72 | 72 | 48 | 60 |

In each of the case of example 24 to 28, XRD analysis of the solid material showed a highly crystalline and completely pure MCM-22 phase. FT-IR spectra also showed the characteristics bands for the presence of double six membered ring species in the range of 555-557 $cm^{-1}$ and 601-603 $cm^{-1}$. It could be seen that, the pure phase of MCM-22 could be obtained even at a very short period of crystallization.

Example 31

Preparation of MCM-22 Using Highly Reactive Metallosilicate Gel (HRMG-6)

To 205 gm of highly reactive metallosilicate hydrogel (HRMG-6) as prepared in the Example 23, was added 17.5 gm of hexamethyleneimine with continuous stirring. The gel was stirred continuously for another 1 h to get homogeneous mixture. The overall composition of the gel was $SiO_2$: $0.039Al_2O_3$:0.15 NaOH:0.35HMI:19.45$H_2O$. The resultant gel was treated hydrothermally at 170° C. for 40 h with continuous stirring. After the treatment, the solid was recovered and calcined following the procedure described earlier. The XRD analysis of the solid material showed a highly crystalline MCM-22 phase without any sort of impurity. FT-IR spectra also showed the characteristics bands for the presence of double six membered ring species in the range of 555-557 $cm^{-1}$ and 600-603 $cm^{-1}$.

Example 32

This example shows the influence of continued hydrothermal treatment of the highly reactive metallosilicate gel (HRMG-6), without addition of any organic template, alkali or water. A sample of highly reactive metallosilicate gel was prepared through hydrothermal treatment at 180° C. for 4 h, following the procedure described in Example 23. The analysis of the aliquot solid sample revealed it X-Ray amorphous, but showing the characteristic FT-IR vibration bands indicating the presence of double six membered silicate or metallosilicate species. Without addition of any templating agent (hexamethyleneimine), or alkali or water, the gel as such was subjected to hydrothermal treatment in stirring conditions at 170° C. for 48 h.

After the crystallization period, the solid material was recovered, dried and calcined as per the procedure described earlier. The final product was found to be X-ray amorphous. Surprisingly, the FT-IR spectra also did not show any vibrational band corresponding to the double six membered ring silicate or metallosilicate species.

Example 33

This example shows the influence of addition of alkali solution only, but not hexamethyleneimine (organic templating agent) to the highly reactive metallosilicate gel (HRMG-6) before continuing the hydrothermal treatment.

A sample of highly reactive metallosilicate gel (HRMG) was prepared by following the procedure as given in Example 23. An aliquot of the gel was examined by XRD and FT-IR spectroscopy. The sample was found to be completely amorphous but FT-IR showed small bands at about 555-557 $cm^{-1}$ and 600-603 $cm^{-1}$ indicating the presence of double six membered silicate or metallosilicate species in the gel. An alkali solution containing 1.07 gm of sodium hydroxide in 80 ml water was added to the aqueous mixture of highly reactive aluminosilicate gel and stirred for homogenization. No hexamethyleneimine was added to this gel. The mixture was treated hydrothermally for crystallization at 170° C. under stirring conditions (300 rpm) for 48 hours. After the crystallization period, the sample was washed well with warm distilled water to remove excess sodium hydroxide, filtered and dried in an air oven overnight. The dried samples were calcined at 550° C. for 6 h in air with flow of 50-100 ml/min. The final product did not show any sort of crystallinity and remained amorphous in nature.

Example 34

This example shows the influence of continued hydrothermal treatment of the highly reactive metallosilicate gel (HRMG-1), without addition of any organic template, alkali or water.

A sample of highly reactive metallosilicate gel was prepared through hydrothermal treatment at 180° C. for 4 h, following the procedure described in Example 18. The analysis of the aliquot solid sample revealed it X-Ray amorphous, but showing the characteristic FT-IR vibration bands indicating the presence of double six membered silicate or metallosilicate species. Without addition of any templating agent (hexamethyleneimine), or alkali or water, the gel as such was subjected to hydrothermal treatment in stirring conditions at 170° C. for 72 h.

After the crystallization period, the solid material was recovered, dried and calcined as per the procedure described earlier. The final product found was to be X-ray amorphous. Surprisingly, the FT-IR spectra also did not show any vibrational band corresponding to the double six membered ring silicate or metallosilicate species.

Technical Advancement:

The improvement or technical advancement in the method of preparation of the present invention is primarily based on the preparation of the highly reactive aqueous metalosilicate gel comprising double six membered silicate or metallosilicate species.

The present process for the preparation of highly reactive metalosilicate gel is essentially devoid of use of any organic structure directing agent or crystalline MWW type zeolite seeds.

The present process is a simple and easy method for the preparation of MCM-22 zeolite with high crystallinity, yield and purity.

The MWW type zeolite is prepared by using a rapid method of the present invention without requirement of any modification of the commercial zeolite manufacturing facilities.

The present process provides preparation of MCM-22 zeolite in short duration of time using inexpensive raw materials.

While considerable emphasis has been placed herein on the specific features of the preferred embodiment, it will be appreciated that many additional features can be added and that many changes can be made in the preferred embodiment without departing from the principles of the invention. These and other changes in the preferred embodiment of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A method for preparing MWW type zeolite comprising the following steps:
   (i) intimately mixing together, in the absence of any organic structure directing agent or crystalline MWW type zeolite seeds, a source of silicon dioxide, a source of metal oxide, water and a pH modifier to obtain an aqueous amorphous metallosilicate gel; wherein said gel comprises at least one silicate selected from the group consisting of a metallosilicate species and double six membered silicate; wherein the molar ratio of the metal oxide to $SiO_2$ is in the range of 0.01:1 to 0.05:1 and the molar ratio of water to $SiO_2$ is in the range of 10:1 to 60:1; and
   (ii) hydrothermally treating said gel in the presence of hexamethyleneimine to provide a crystalline MWW type zeolite.

2. The method as claimed in claim 1, wherein the hydrothermal treatment of said gel is performed in the presence of an aqueous alkali.

3. The method as claimed in claim 1, wherein the source of silicon dioxide is at least one selected from the group consisting of hydrated precipitated silica, colloidal silica, ammonia-stabilized colloidal silica, sodium silicate, potassium silicate, calcium silicate, siloxane and alkoxy silane.

4. The method as claimed in claim 1, wherein the source of silicon dioxide is colloidal silica.

5. The method as claimed in claim 1, wherein the source of silicon dioxide is sodium silicate.

6. The method as claimed in claim 1, wherein the source of silicon dioxide is ammonia-stabilized colloidal silica having between 30 to 40% weight of silica.

7. The method as claimed in claim 1, wherein the source of metal oxide is at least one element of group IIIA of the periodic table.

8. The method as claimed in claim 1, wherein the source of metal oxide is at least one selected from the group consisting of trivalent metal oxides and a mixture of the trivalent metal oxides.

9. The method as claimed in claim 1, wherein the source of metal oxide is at least one selected from the group consisting of aluminium oxide, gallium oxide, aluminium alkoxides, sodium aluminate, aluminium sulphate, aluminium nitrate, gallium nitrate and mixtures thereof.

10. The method as claimed in claim 1, wherein the source of metal oxide is aluminium oxide.

11. The method as claimed in claim 1, wherein the source of metal oxide is gallium oxide.

12. The method as claimed in claim 1, wherein the source of metal oxide is a mixture of aluminium oxide and gallium oxide.

13. The method as claimed in claim 1, wherein the pH modifier is at least one selected from the group consisting of alkali and acids.

14. The method as claimed in claim 1, wherein the pH modifier is alkali and the molar ratio of alkali to $SiO_2$ is in the range of 0.1:1 to 0.5:1.

15. The method as claimed in claim 1, wherein the pH modifier is acid and the mole ratio of acid to $SiO_2$ is in the range of 0.0:1 to 0.25:1.

16. The method as claimed in claim 1, wherein the pH modifier is at least one alkali selected from the group consisting of sodium hydroxide, lithium hydroxide, potassium hydroxide and cesium hydroxide.

17. The method as claimed in claim 1, wherein the pH modifier is at least one acid is selected from the group consisting of inorganic acids, organic monobasic acids and organic polybasic acids.

18. The method as claimed in claim 1, wherein the pH modifier is at least one acid selected from the group consisting of sulphuric acid, nitric acid, hydrochloric acid, phosphoric acid, formic acid, acetic acid, propionic acid, oxalic acid and succinic acid.

19. The method as claimed in claim 1, wherein the pH modifier is sulphuric acid.

20. The method as claimed in claim 1, wherein said gel has vibration bands at around 555-557 and 601-603 $cms^{-1}$ in the FT-IR spectroscopy of the amorphous gel.

21. The method as claimed in claim 1, wherein the hydrothermal treatment is performed at a temperature in the range of 80° C. and 200° C.

22. The method as claimed in claim 1, wherein the hydrothermal treatment is performed for a period of 2 hours to 100 hours.

23. The method as claimed in claim 1, wherein the hydrothermal treatment is performed at a pressure ranging from sub-atmospheric to supercritical.

24. The method as claimed in claim 1, wherein the hydrothermal treatment is performed at a pressure equal to the pressure exerted by the vapours held within the vessel in which the hydrothermal treatment is carried out.

25. The method as claimed in claim 1, wherein the hydrothermal treatment is performed at pressure in the range of 1 bar to 50 bar.

26. The method as claimed in claim 1, wherein the preparation of said gel is performed under continuous stirring during and after the addition of the components.

27. The method as claimed in claim 1, further includes a step of adding an alkali together with the templating agent to raise the pH of said gel in between 8 and 12.

* * * * *